United States Patent
Hou et al.

(10) Patent No.: US 9,521,545 B2
(45) Date of Patent: Dec. 13, 2016

(54) METHODS AND SYSTEMS FOR NOTIFICATION MANAGEMENT BETWEEN AN ELECTRONIC DEVICE AND A WEARABLE ELECTRONIC DEVICE

(71) Applicant: Noodoe Corporation, Taipei (TW)

(72) Inventors: Yi-An Hou, Taipei (TW); John C. Wang, Taipei (TW)

(73) Assignee: NOODOE CORPORATION, Taipei (TW)

( * ) Notice: Subject to any disclaimer, the term of this patent is extended or adjusted under 35 U.S.C. 154(b) by 0 days.

(21) Appl. No.: 14/874,533

(22) Filed: Oct. 5, 2015

(65) Prior Publication Data

US 2016/0105795 A1 Apr. 14, 2016

(30) Foreign Application Priority Data

Oct. 14, 2014 (TW) .............................. 103135483 A

(51) Int. Cl.
| | |
|---|---|
| *H04W 8/00* | (2009.01) |
| *H04W 8/24* | (2009.01) |
| *H04B 1/3827* | (2015.01) |
| *G06F 1/16* | (2006.01) |
| *G06F 3/01* | (2006.01) |

(Continued)

(52) U.S. Cl.
CPC ............... *H04W 8/24* (2013.01); *G06F 1/163* (2013.01); *G06F 3/017* (2013.01); *G06F 3/0346* (2013.01); *H04B 1/385* (2013.01); *H04M 1/7253* (2013.01); *H04M 19/04* (2013.01); *H04W 8/005* (2013.01); *H04W 52/0254* (2013.01); *H04W 68/02* (2013.01); *H04M 2250/02* (2013.01); *H04M 2250/06* (2013.01); *H04M 2250/12* (2013.01)

(58) Field of Classification Search
CPC .... H04W 8/24; H04W 8/005; H04W 52/0254; H04W 68/02; H04B 1/385; G06F 1/163; G06F 3/017; G06F 3/0346; H04M 1/7253; H04M 19/04; H04M 2250/02; H04M 2250/06; H04M 2250/12
See application file for complete search history.

(56) References Cited

U.S. PATENT DOCUMENTS

| | | | |
|---|---|---|---|
| 2013/0262298 A1* | 10/2013 | Morley .................. | H04M 1/05 705/39 |
| 2015/0185827 A1* | 7/2015 | Sayed .................... | G06F 3/013 345/156 |

(Continued)

FOREIGN PATENT DOCUMENTS

| | | |
|---|---|---|
| EP | 2779605 A1 | 9/2014 |
| TW | 201116032 A1 | 5/2011 |

(Continued)

*Primary Examiner* — Thanh Le
(74) *Attorney, Agent, or Firm* — McClure, Qualey & Rodack, LLP

(57) ABSTRACT

Methods and systems for notification management between an electronic device and a wearable electronic device are provided. First, the electronic device receives state information from a wearable electronic device via a wireless network, wherein at least one sensor detects a motion of the wearable electronic device to accordingly generate the state information. Then, a notification management process is performed between the electronic device and the wearable electronic device according to the state information.

7 Claims, 8 Drawing Sheets

(51) Int. Cl.
*H04M 1/725* (2006.01)
*H04M 19/04* (2006.01)
*H04W 52/02* (2009.01)
*H04W 68/02* (2009.01)
*G06F 3/0346* (2013.01)

(56) References Cited

U.S. PATENT DOCUMENTS

| | | | | |
|---|---|---|---|---|
| 2015/0301574 | A1* | 10/2015 | Kim | G06F 1/163 |
| | | | | 345/156 |
| 2016/0018898 | A1* | 1/2016 | Tu | G06F 1/163 |
| | | | | 345/156 |
| 2016/0094700 | A1* | 3/2016 | Lee | H04B 1/385 |
| | | | | 455/419 |

FOREIGN PATENT DOCUMENTS

| | | |
|---|---|---|
| TW | 201237575 A1 | 9/2012 |
| WO | 2014143959 A2 | 9/2014 |
| WO | 2015138409 A1 | 9/2015 |
| WO | 2015160193 A1 | 10/2015 |
| WO | 2015178562 A1 | 11/2015 |

* cited by examiner

METHODS AND SYSTEMS FOR NOTIFICATION MANAGEMENT BETWEEN AN ELECTRONIC DEVICE AND A WEARABLE ELECTRONIC DEVICE

BACKGROUND OF THE INVENTION

Field of the Invention

The disclosure relates generally to notification management methods and systems, and, more particularly to methods and systems that can appropriately manage the notifications between an electronic device and a wearable electronic device.

Description of the Related Art

Recently, electronic devices, such as smart phones, tablets, notebooks, and other portable devices, have become more and more technically advanced and multifunctional. For example, portable devices have network connectivity capabilities. Users can use their portable devices to connect to networks at anytime and anywhere. The convenience and new functionalities advanced by modern technology have made these devices into necessities of life.

Furthermore, with the coming of IOT (Internet Of Things) generation, every device or object can connect to networks, and users can access and control these devices or objects via networks. Currently, wearable electronic devices have become the most tangible applications of IOT. In some cases, the wearable device can detect health information of a user, record exercise information and sleep patterns, or display email messages or incoming calls notifications.

However, since there is a size limitation to wearable electronic devices, the battery capacity and battery life of the devices are high priority issues in the industry. In some cases of network communication, a smart phone can transmit related notifications, such as email messages or incoming calls to the wearable electronic device via a wireless network. Since any communication between the smart phone and the wearable electronic device consumes the power of the wearable electronic device, the power usage efficiency of the wearable electronic device can be improved if the communications between the smart phone and the wearable electronic device are appropriately managed. In some cases, the transmission of the communications between the smart phone and the wearable electronic device may be unnecessary. For example, when a user does not currently wear a wearable electronic device, the process of transmitting related notifications to the wearable electronic device may be redundant. Furthermore, the increased power consumption of the wearable electronic device is also wasted.

BRIEF SUMMARY OF THE INVENTION

Methods and systems for notification management between an electronic device and a wearable electronic device are provided, wherein the notifications between the electronic device, such as a smart phone and the wearable electronic device can be appropriately managed.

In an embodiment of a method for notification management between an electronic device and a wearable electronic device, state information is received from a wearable electronic device via a wireless network, wherein the wearable electronic device has at least one sensor for detecting a motion of the wearable electronic device to accordingly generate the state information. Then, a notification management process is performed between the electronic device and the wearable electronic device according to the state information.

An embodiment of a system for notification management between an electronic device and a wearable electronic device comprises a wearable electronic device and an electronic device. The wearable electronic device has at least one sensor for detecting a motion of the wearable electronic device to accordingly generate the state information. The electronic device receives the state information from the wearable electronic device via a wireless network, and performs a notification management process between the electronic device and the wearable electronic device according to the state information.

In some embodiments, the notification management process comprises a step of determining whether the electronic device should transmit a notification corresponding to at least one event to the wearable electronic device via the wireless network according to the state information.

In some embodiments, the state information comprises a first state, where the first state has a stop-notifying instruction. When the electronic device receives the first state from the wearable electronic device, the electronic device stores the event, and directly generates a notification corresponding to the event via the electronic device, however, the event is not transmitted to the wearable electronic device via the wireless network.

In some embodiments, the state information comprises a second state, where the second state has a resume-notifying instruction. When the electronic device receives the second state from the wearable electronic device, the electronic device transmits the stored event to the wearable electronic device via the wireless network.

In an embodiment of a method for notification management between an electronic device and a wearable electronic device, a stop-notifying instruction is received from a wearable electronic device via a wireless network by an electronic device. In response to the stop-notifying instruction, when the electronic device obtains at least one event, the electronic device stores the event, and directly generates a notification corresponding to the event via the electronic device, however, the event is not transmitted to the wearable electronic device via the wireless network.

An embodiment of a system for notification management between an electronic device and a wearable electronic device comprises a wireless connecting unit and a processing unit. The wireless connecting unit receives a stop-notifying instruction from a wearable electronic device via a wireless network. In response to the stop-notifying instruction, when the electronic device obtains at least one event, the processing unit stores the event, and directly generates a notification corresponding to the event via the electronic device, however, the event is not transmitted to the wearable electronic device via the wireless network.

In some embodiments, the wearable electronic device has at least one sensor. When data detected by the sensor indicates that the wearable electronic device does not substantially move in a predefined interval, the wearable electronic device generates the stop-notifying instruction.

In some embodiments, when the electronic device does not receive the stop-notifying instruction, the event is transmitted to the wearable electronic device via the wireless network once the event is received.

In some embodiments, a resume-notifying instruction is received from the wearable electronic device via the wireless network. In response to the resume-notifying instruction, the stored event is transmitted to the wearable electronic device via the wireless network.

In some embodiments, the wearable electronic device has at least one sensor. When data detected by the sensor indicates that the wearable electronic device moves, the wearable electronic device generates the resume-notifying instruction.

In some embodiments, at least one stored event is integrated into a notification to be transmitted to the wearable electronic device.

In some embodiments, the event comprises a notification corresponding to an incoming call, a message, an email message, and/or a calendar reminder.

Methods for notification management between an electronic device and a wearable electronic device may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

Methods and systems for notification management between an electronic device and a wearable electronic device are provided.

Figure 1:
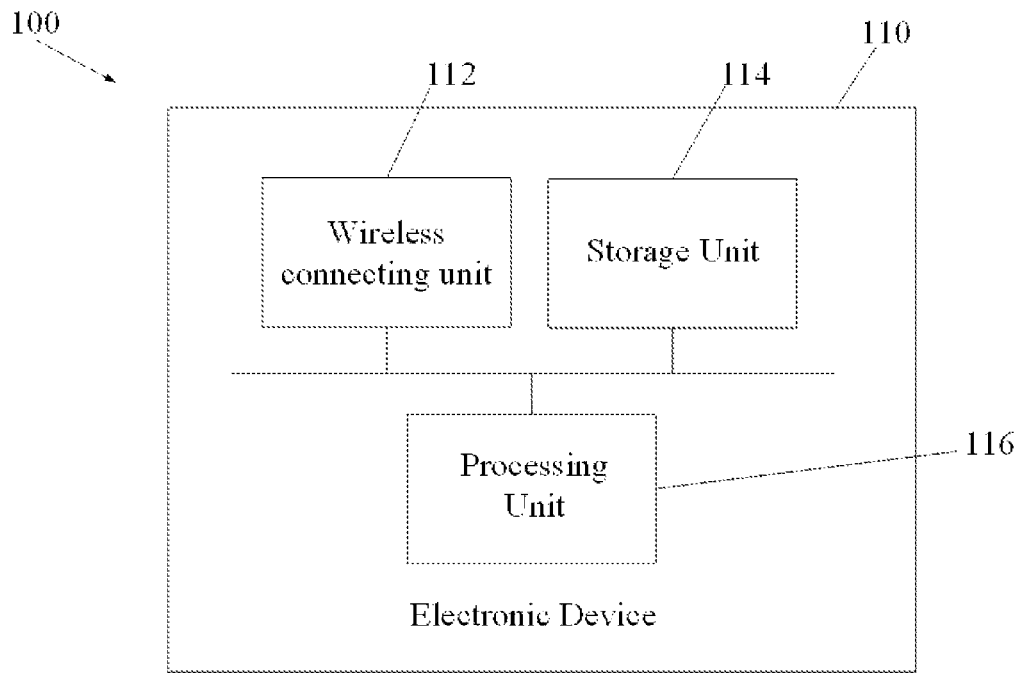
FIG. 1 is a schematic diagram illustrating an embodiment of a system for notification management between an electronic device and a wearable electronic device of the invention.

FIG. 1 is a schematic diagram illustrating an embodiment of a system for notification management between an electronic device and a wearable electronic device of the invention. The system for notification management between an electronic device and a wearable electronic device 100 can be used in an electronic device 110, such as a mobile phone, a smart phone, a PDA (Personal Digital Assistant), a GPS (Global Positioning System), a notebook, a tablet computer, or other portable device. As shown in FIG. 1, the electronic device 110 comprises a wireless connecting unit 112, a storage unit 114, and a processing unit 116. The wireless connecting unit 112 can connect to other electronic devices having wireless connecting capabilities via a wireless network, such as Wi-Fi or Bluetooth network. The storage unit 114 can store related data. The processing unit 116 can control related operations of hardware and software in the electronic device 110, and perform the methods for notification management between an electronic device and a wearable electronic device of the invention. This will be discussed further in the following paragraphs. It is understood that, in some embodiments, the electronic device 110 can further comprise a display unit (not shown in FIG. 1) for displaying related information, such as images, interfaces, and related data. In some embodiments, the electronic device 110 can further comprise a sound output unit (not shown in FIG. 1) for generating sounds. In some embodiments, the electronic device 110 can further comprise a vibration unit (not shown in FIG. 1) for generating vibrations.

Figure 2:
FIG. 2 is a schematic diagram illustrating another embodiment of a system for notification management between an electronic device and a wearable electronic device of the invention.

FIG. 2 is a schematic diagram illustrating another embodiment of a system for notification management between an electronic device and a wearable electronic device of the invention. The system for notification management between an electronic device and a wearable electronic device 100 comprises an electronic device 110 and a wearable electronic device 120. In some embodiments, the electronic device 110 may be a portable device, such as a mobile phone, a smart phone, a PDA, a GPS, a notebook, or a tablet computer. In some embodiments, the electronic device 110 can connect to the wearable electronic device 120 via a wireless network 130, such as Wi-Fi or Bluetooth network.

Figure 3:
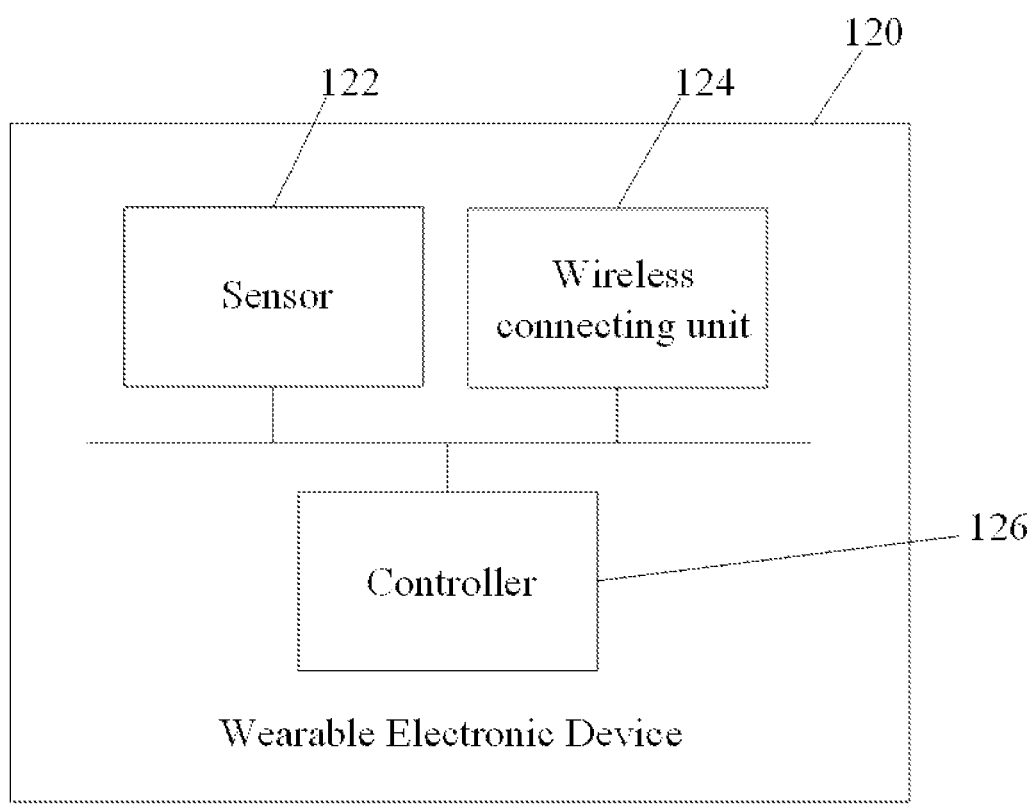
FIG. 3 is a schematic diagram illustrating an embodiment of a wearable electronic device of the invention.

FIG. 3 is a schematic diagram illustrating an embodiment of a wearable electronic device of the invention. As shown in FIG. 3, the wearable electronic device 120 comprises at least one sensor 122, a wireless connecting unit 124, and a controller 126. The sensor 122 can detect related data to determine whether the wearable electronic device moves. It is understood that, in some embodiments, the sensor 122 may be an accelerometer such as a G-sensor for generating information of velocity and displacement when the device moves. In some embodiments, the sensor 122 may be a Gyro sensor for generating information of angular acceleration when the device moves. It is noted that, the above sensors are only examples of the present application, and the present invention is not limited thereto. Any sensor which can determine whether the wearable electronic device moves can be applied in the present invention. The wireless connecting unit 124 can connect to other electronic devices, such as the electronic device 110 having wireless connecting capabilities via a wireless network, such as Wi-Fi or Bluetooth network. The controller 126 can control related operations of hardware and software in the wearable electronic device 120, and perform the methods for notification management between an electronic device and a wearable electronic device of the invention, which will be discussed in the following paragraphs.

Figure 4:
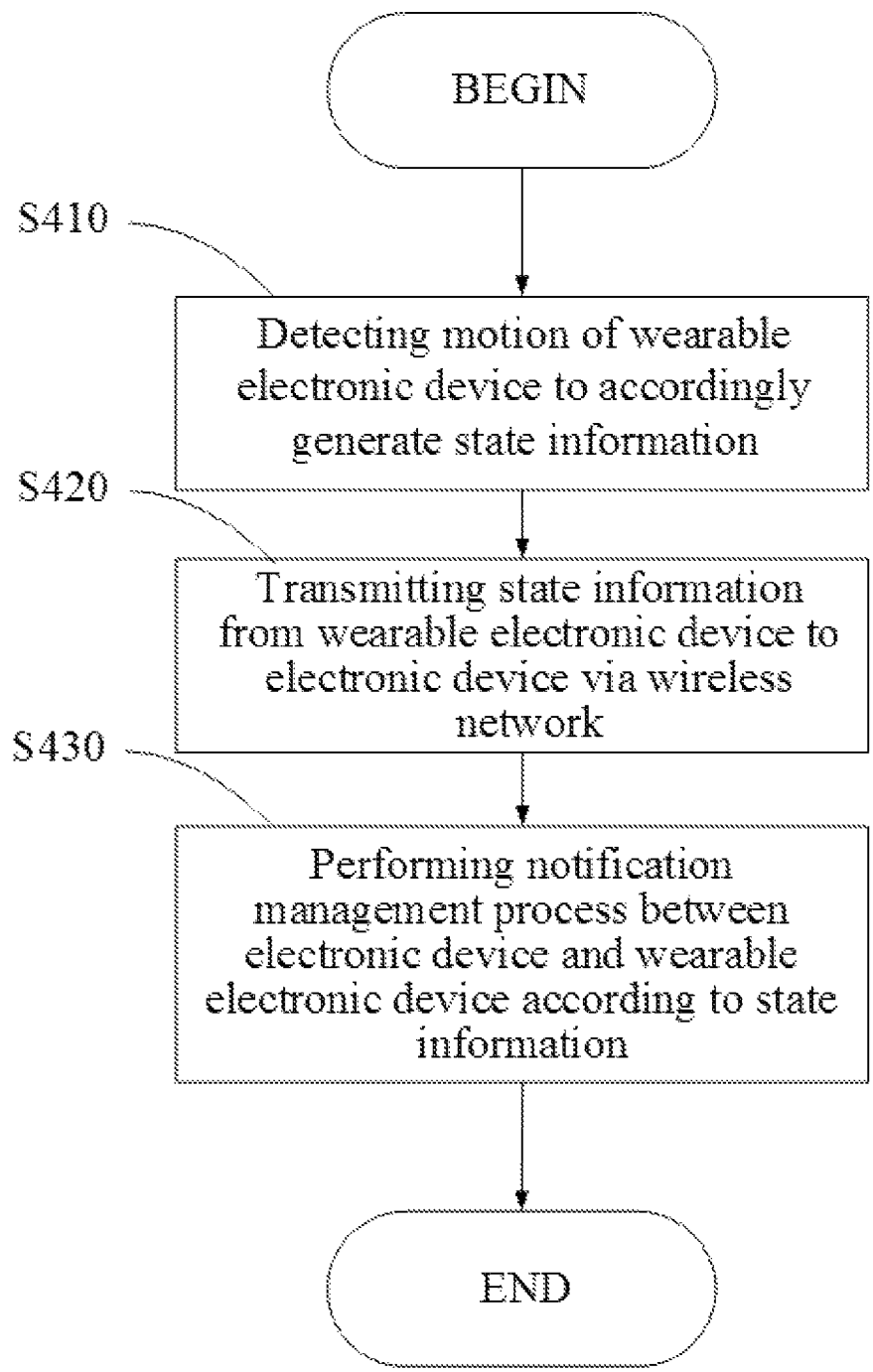
FIG. 4 is a flowchart of an embodiment of a method for notification management between an electronic device and a wearable electronic device of the invention.

FIG. 4 is a flowchart of an embodiment of a method for notification management between an electronic device and a wearable electronic device of the invention. The method for notification management between an electronic device and a wearable electronic device can be used in an electronic device, such as a mobile phone, a smart phone, a PDA, a GPS, a notebook, a tablet computer, or other portable device.

In step S410, a motion of the wearable electronic device is detected by at least one sensor of the wearable electronic device, and state information of the wearable electronic device is determined according to the motion. In step S420, the wearable electronic device transmits the state information to the electronic device via a wireless network, such as Wi-Fi or Bluetooth network. Then, in step S430, the electronic device performs a notification management process between the electronic device and the wearable electronic device according to the state information. It is understood that, in some embodiments, the notification management process comprises a step of determining whether to transmit a notification corresponding to at least one event to the wearable electronic device via the wireless network according to the state information by the electronic device In some embodiments, the state information comprises a first state, where the first state has a stop-notifying instruction. When the electronic device receives the first state from the wearable electronic device, the electronic device stores the event, and directly generates a notification corresponding to the event via the electronic device, however, the event is not transmitted to the wearable electronic device via the wireless network. In some embodiments, the state information comprises a second state, and the second state has a resume-notifying instruction. When the electronic device receives the second state from the wearable electronic device, the electronic device transmits the stored event to the wearable electronic device via the wireless network. It is noted that, the manner for determining the state information based on the motion can be designed according to different requirements and applications. For example, when the wearable electronic device does not substantially move in a predefined interval, the state information of the wearable electronic device can be set as the first state having the stop-notifying instruction. When the wearable electronic device moves again, the state information of the wearable electronic device can be set as the second state having the resume-notifying instruction. It is noted that, the above state information and the above notification management process are only examples of the present application, and the present invention is not limited thereto.

Figure 5:
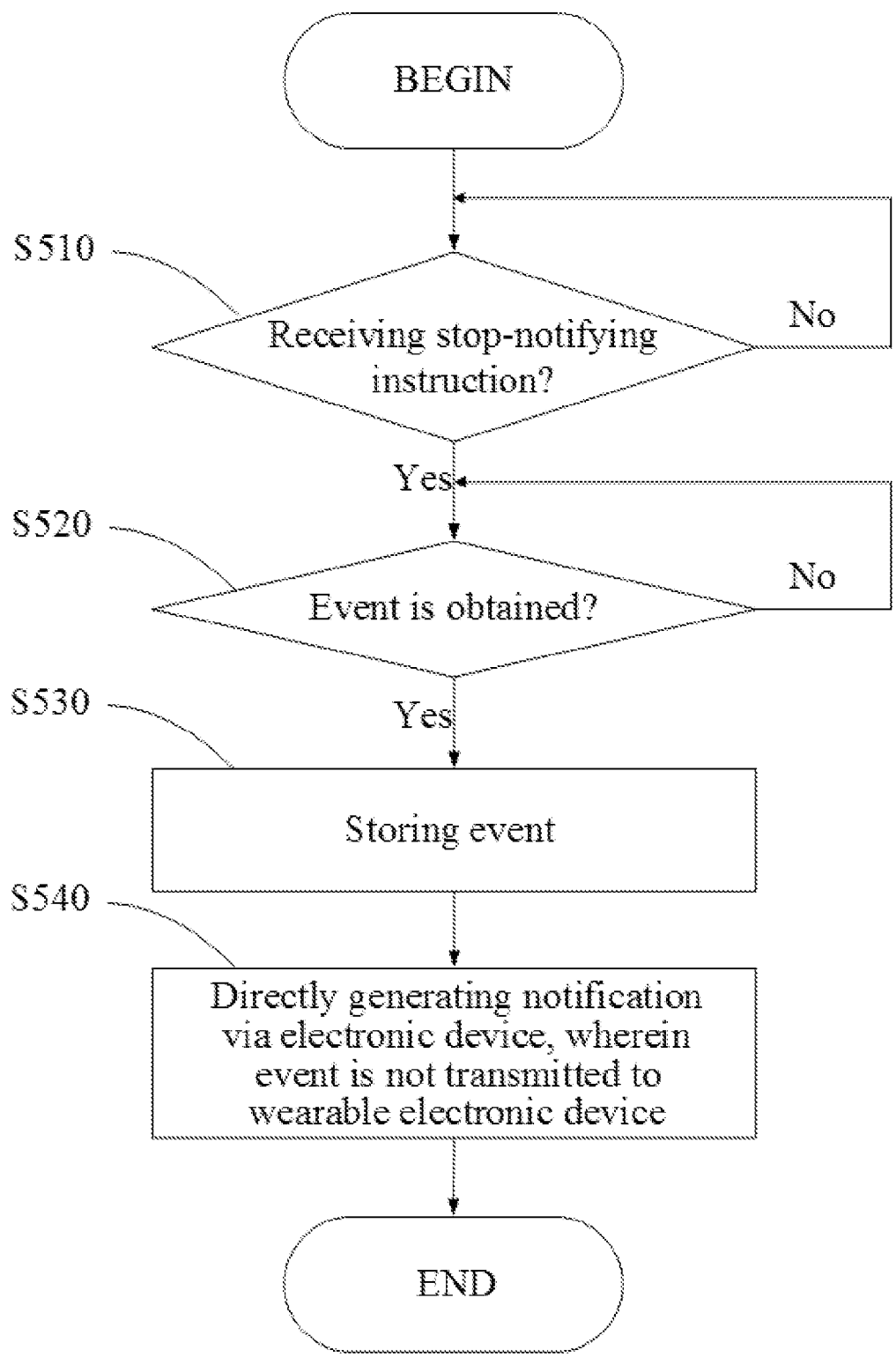
FIG. 5 is a flowchart of another embodiment of a method for notification management between an electronic device and a wearable electronic device of the invention.

FIG. 5 is a flowchart of another embodiment of a method for notification management between an electronic device and a wearable electronic device of the invention. The method for notification management between an electronic device and a wearable electronic device can be used in an electronic device, such as a mobile phone, a smart phone, a PDA, a GPS, a notebook, a tablet computer, or other portable device.

Figure 7:
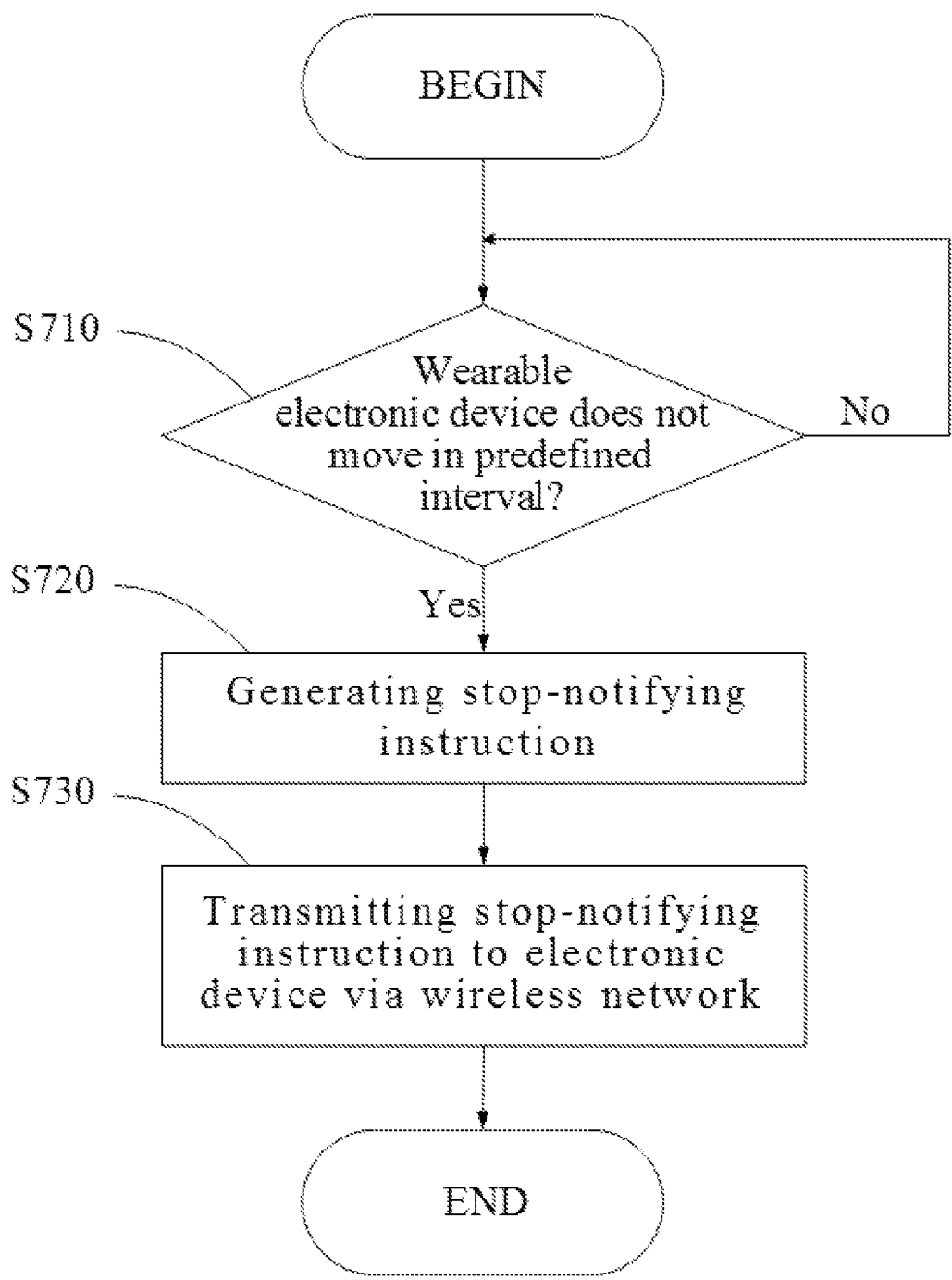
FIG. 7 is a flowchart of an embodiment of a method for generating a stop-notifying instruction.

In step S510, it is determined whether a stop-notifying instruction is received from a wearable electronic device via a wireless network, such as Wi-Fi or Bluetooth network. FIG. 7 is a flowchart of an embodiment of a method for generating a stop-notifying instruction. In step S710, it is determined whether the wearable electronic device does not move in a predefined interval according to data detected by at least one sensor of the wearable electronic device. When the wearable electronic device moves in the predefined interval (No in step S710), the procedure remains at step S710. When the wearable electronic device does not move in the predefined interval (Yes in step S710), in step S720, the wearable electronic device generates a stop-notifying instruction, and in step S730, transmits the stop-notifying instruction to the electronic device via the wireless network. It is understood that, in some embodiments, when the electronic device receives the stop-notifying instruction from the wearable electronic device, a specific flag can be set from 0 to 1, representing that the stop-notifying instruction is received. When the stop-notifying instruction is not received from the wearable electronic device (No in step S510), the procedure remains at step S510. When the stop-notifying instruction is received from the wearable electronic device (Yes in step S510), in step S520, it is determined whether an event is obtained by the electronic device. It is understood that, in some embodiments, the event comprises a notification corresponding to an incoming call, a message, an email message, and/or a calendar reminder. It is noted that, the above events are only examples of the present application, and the present invention is not limited thereto. When no event is obtained (No in step S520), the procedure remains at step S520. When an event is obtained (Yes in step S520), in step S530, the event is stored, and in step S540, a notification corresponding to the event is directly generated via the electronic device. For example, the event can be displayed via a display unit, a vibration indicating the event can be generated by a vibration unit, or a sound indicating that the event can be generated. It is noted that, the event will not be transmitted to the wearable electronic device in step S540.

Figure 6:
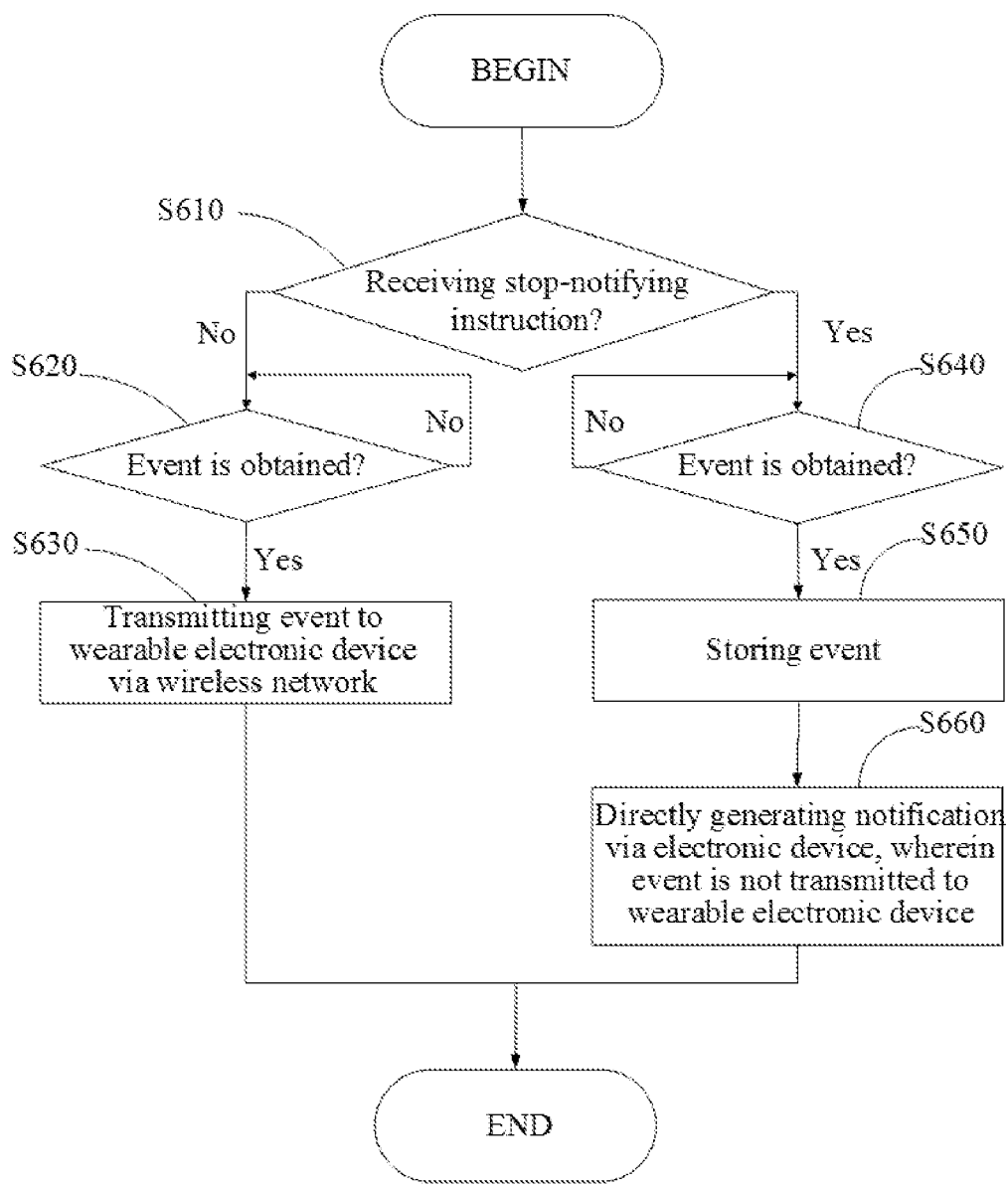
FIG. 6 is a flowchart of another embodiment of a method for notification management between an electronic device and a wearable electronic device of the invention.

FIG. 6 is a flowchart of another embodiment of a method for notification management between an electronic device and a wearable electronic device of the invention. The method for notification management between an electronic device and a wearable electronic device can be used in an electronic device, such as a mobile phone, a smart phone, a PDA, a GPS, a notebook, a tablet computer, or other portable device.

In step S610, it is determined whether a stop-notifying instruction is received from a wearable electronic device via a wireless network, such as Wi-Fi or Bluetooth network. Similarly, in some embodiments, it is determined whether the wearable electronic device does not move in a predefined interval. When the wearable electronic device does not move in the predefined interval, the wearable electronic device generates a stop-notifying instruction, and transmits the stop-notifying instruction to the electronic device via the wireless network. Similarly, in some embodiments, when the electronic device receives the stop-notifying instruction from the wearable electronic device, a specific flag can be set from 0 to 1, representing that the stop-notifying instruction is received. When the stop-notifying instruction is not received from the wearable electronic device (No in step S610), in step S620, it is determined whether an event is obtained by the electronic device. It is understood that, in some embodiments, the event comprises a notification corresponding to an incoming call, a message, an email message, and/or a calendar reminder. It is noted that, the above events are only examples of the present application, and the present invention is not limited thereto. When no event is obtained (No in step S620), the procedure remains at step S620. When an event is obtained (Yes in step S620), in step S630, the event is transmitted to the wearable electronic device via a wireless network. When the stop-notifying instruction is received from the wearable electronic device (Yes in step S610), in step S640, it is determined whether an event is obtained by the electronic device. Similarly, in some embodiments, the event comprises a notification corresponding to an incoming call, a message, an email message, and/or a calendar reminder. It is noted that, the above events are only examples of the present application, and the present invention is not limited thereto. When no event is obtained (No in step S640), the procedure remains at step S640. When an event is obtained (Yes in step S640), in step S650, the event is stored, and in step S660, a notification corresponding to the event is directly generated via the electronic device. As described, when the electronic device receives the stop-notifying instruction from the wearable electronic device, the specific flag can be set to 1. In some embodiments, when the electronic device obtains an event, the value of the specific flag will be checked. When the value of the specific flag is 0, the event will be directly transmitted to the wearable electronic device via a wireless network. When the value of the specific flag is 1, the event will be stored, but the event will not be transmitted to the wearable electronic device.

Figure 8:
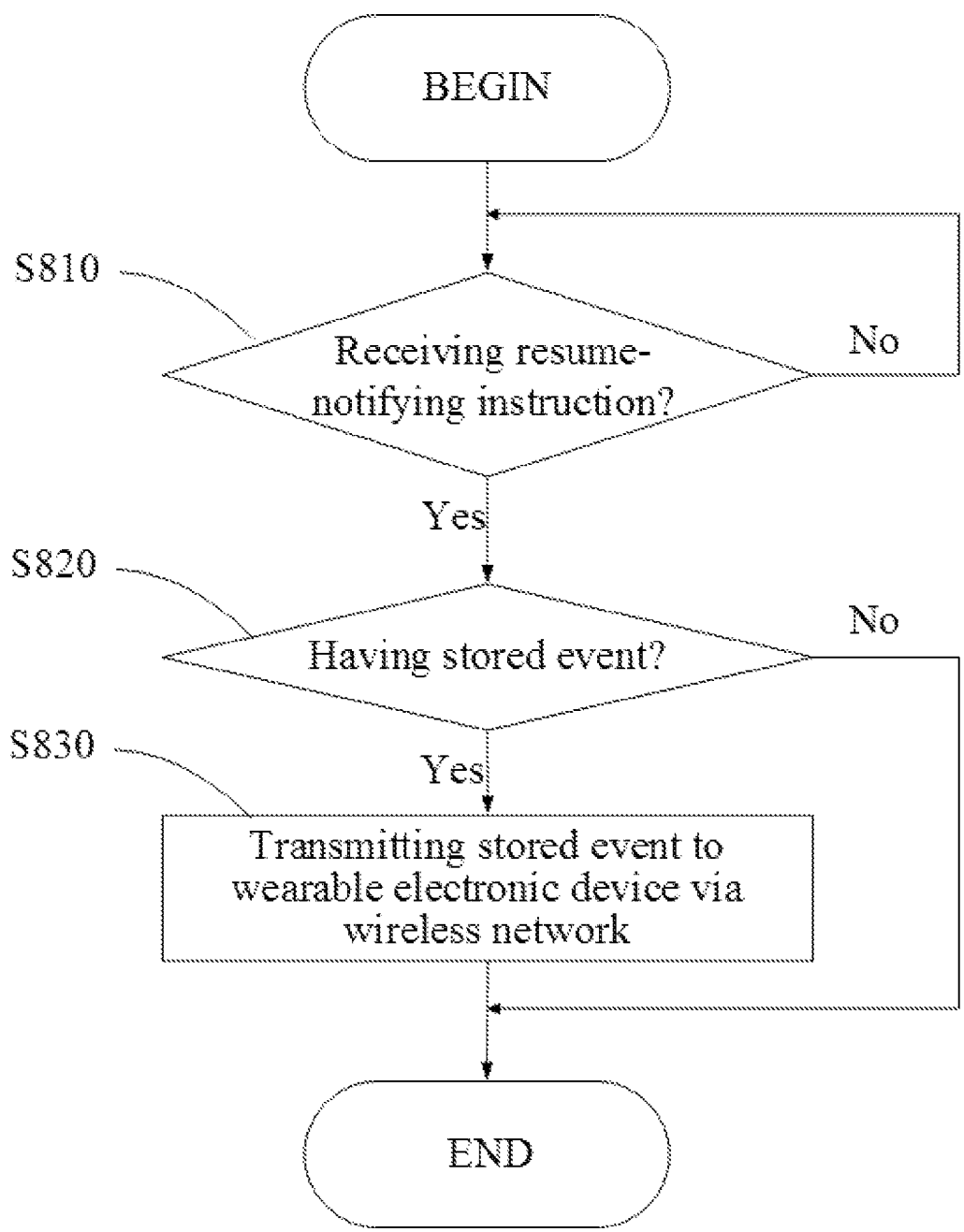
FIG. 8 is a flowchart of another embodiment of a method for notification management between an electronic device and a wearable electronic device of the invention.

FIG. 8 is a flowchart of another embodiment of a method for notification management between an electronic device and a wearable electronic device of the invention. The method for notification management between an electronic device and a wearable electronic device can be used in an electronic device, such as a mobile phone, a smart phone, a PDA, a GPS, a notebook, a tablet computer, or other portable device.

Figure 9:
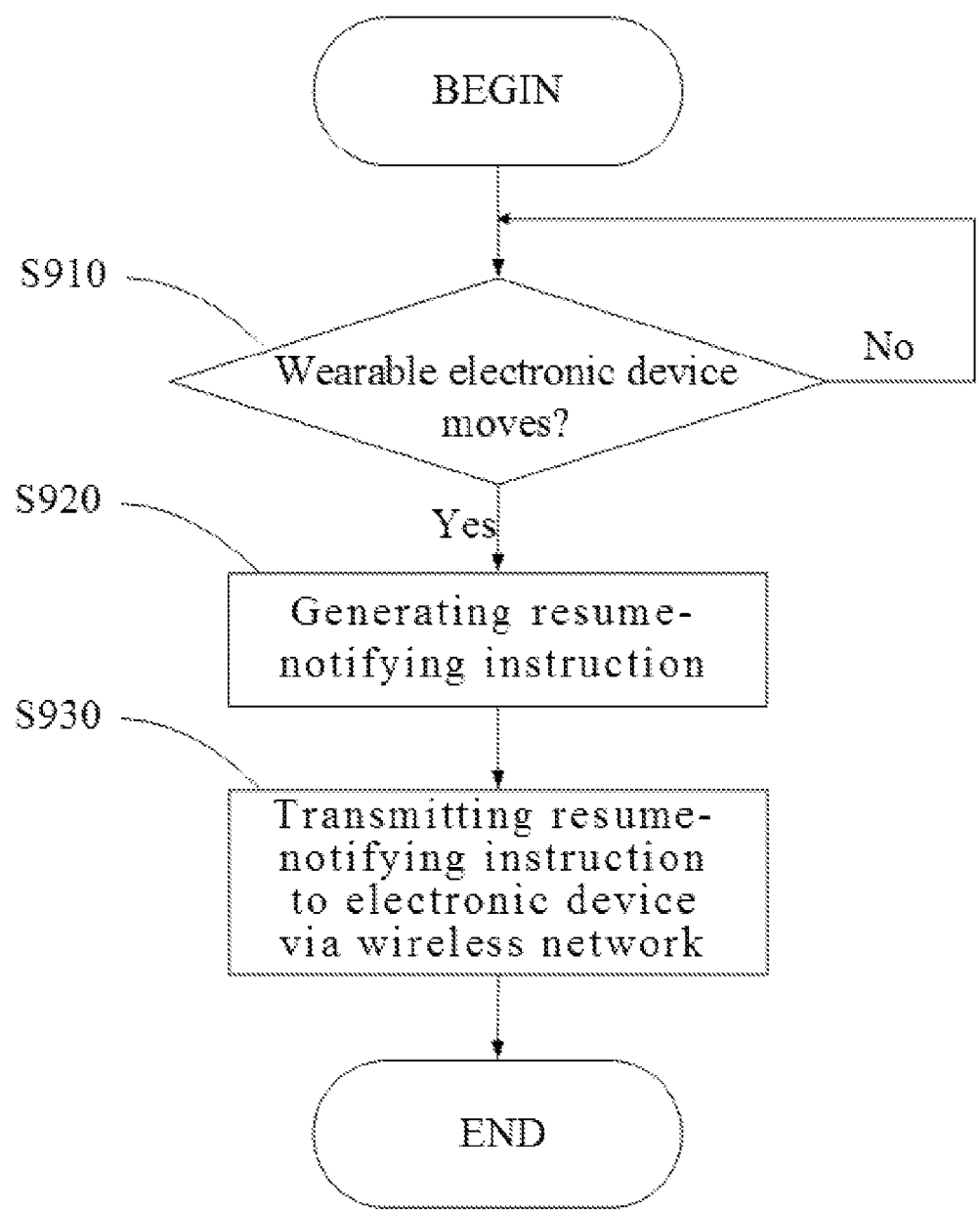
FIG. 9 is a flowchart of an embodiment of a method for generating a resume-notifying instruction.

In step S510, it is determined whether a resume-notifying instruction is received from a wearable electronic device via a wireless network, such as Wi-Fi or Bluetooth network. FIG. 9 is a flowchart of an embodiment of a method for generating a resume-notifying instruction. In step S910, it is determined whether the wearable electronic device moves according to data detected by at least one sensor of the wearable electronic device. When the wearable electronic device does not move (No in step S910), the procedure remains at step S910. When the wearable electronic device moves (Yes in step S910), in step S920, the wearable electronic device generates a resume-notifying instruction, and in step S930, transmits the resume-notifying instruction to the electronic device via the wireless network. It is understood that, in some embodiments, when the electronic device receives the resume-notifying instruction from the wearable electronic device, a specific flag can be set from 1 to 0, representing that the resume-notifying instruction is received. When the resume-notifying instruction is not received from the wearable electronic device (No in step S810), the procedure remains at step S810. When the resume-notifying instruction is received from the wearable electronic device (Yes in step S810), in step S820, it is determined whether the electronic device has any stored event. When the electronic device does not have any stored event (No in step S820), the procedure is completed. When the electronic device has at least one stored event (Yes in step S820), in step S830, the stored events are transmitted to the wearable electronic device via the wireless network. It is understood that, in some embodiments, the stored events can be respectively transmitted to the wearable electronic device via the wireless network. In some embodiments, the stored events can be integrated into a notification to be transmitted to the wearable electronic device via the wireless network.

Therefore, the methods and systems for notification management between an electronic device and a wearable electronic device of the present invention can appropriately manage the notifications between an electronic device, such as a smart phone and a wearable electronic device, thereby realizing smart communications and further improving power management between devices.

Methods for notification management between an electronic device and a wearable electronic device may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for executing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for executing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalent.

What is claimed is:

1. A method for notification management between an electronic device and a wearable electronic device for use in an electronic device, comprising:

receiving state information from a wearable electronic device via a wireless network, wherein the wearable electronic device comprises at least one sensor for detecting a motion of the wearable electronic device to accordingly generate the state information; and performing a notification management process between the electronic device and the wearable electronic device according to the state information, wherein the state information comprises a first state and a second state, and the first state has a stop-notifying instruction and the second state has a resume-notifying instruction, when the electronic device receives the first state from the wearable electronic device, the electronic device stores the event, and directly generates a notification corresponding to the event via the electronic device, and the event is not transmitted to the wearable electronic device via the wireless network, when the electronic device receives the second state from the wearable electronic device, the electronic device transmits the stored event to the wearable electronic device via the wireless network, in which the at least one stored event is integrated into a notification to be transmitted to the wearable electronic device.

2. The method of claim 1, wherein the notification management process comprises a step of determining whether to transmit a notification corresponding to at least one event to the wearable electronic device via the wireless network according to the state information by the electronic device.

3. The method of claim 1, wherein the wearable electronic device comprises at least one sensor, and when data detected by the sensor indicates that the wearable electronic device does not substantially move in a predefined interval, the wearable electronic device generates the stop-notifying instruction.

4. The method of claim 1, further comprising a step of when the electronic device does not receive the stop-notifying instruction, transmitting the event to the wearable electronic device via the wireless network once the event is received.

5. The method of claim 1, wherein the wearable electronic device comprises at least one sensor, and when data detected by the sensor indicates that the wearable electronic device moves, the wearable electronic device generates the resume-notifying instruction.

6. A system for notification management between an electronic device and a wearable electronic device, comprising:

a wearable electronic device comprising at least one sensor for detecting a motion of the wearable electronic device to accordingly generate state information; and an electronic device receiving the state information from the wearable electronic device via a wireless network, and performing a notification management process between the electronic device and the wearable electronic device according to the state information, wherein the state information comprises a first state and a second state, and the first state has a stop-notifying instruction and the second state has a resume-notifying instruction, when the electronic device receives the first state from the wearable electronic device, the electronic device stores the event, and directly generates a notification corresponding to the event via the electronic device, and the event is not transmitted to the wearable electronic device via the wireless network, when the electronic device receives the second state from the wearable electronic device, the electronic device transmits the stored event to the wearable electronic device via the wireless network, in which the at least one stored event is integrated into a notification to be transmitted to the wearable electronic device.

7. A non-transitory machine-readable storage medium comprising a computer program, which, when executed, causes a device to perform a method for notification management between an electronic device and a wearable electronic device, wherein the method comprises:

receiving state information from a wearable electronic device via a wireless network, wherein the wearable electronic device comprises at least one sensor for detecting a motion of the wearable electronic device to accordingly generate the state information; and performing a notification management process between the electronic device and the wearable electronic device according to the state information, wherein the state information comprises a first state and a second state, and the first state has a stop-notifying instruction and the second state has a resume-notifying instruction, when the electronic device receives the first state from the wearable electronic device, the electronic device stores the event, and directly generates a notification corresponding to the event via the electronic device, and the event is not transmitted to the wearable electronic device via the wireless network, when the electronic device receives the second state from the wearable electronic device, the electronic device transmits the stored event to the wearable electronic device via the wireless network, in which the at least one stored event is integrated into a notification to be transmitted to the wearable electronic device.

* * * * *